(12) United States Patent
Michael et al.

(10) Patent No.: US 11,275,890 B2
(45) Date of Patent: *Mar. 15, 2022

(54) METHOD AND SYSTEM FOR STASHING OF DOCUMENT ALTERATION INFORMATION FOR QUICKER WEB PREVIEW

(71) Applicant: Open Text Corporation, Waterloo (CA)

(72) Inventors: Deepak Michael, Bangalore (IN); Sreejith Prabhakaran Nair, Ernakulam (IN)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/721,323

(22) Filed: Dec. 19, 2019

(65) Prior Publication Data

US 2020/0125794 A1     Apr. 23, 2020

Related U.S. Application Data

(63) Continuation of application No. 13/628,511, filed on Sep. 27, 2012, now Pat. No. 10,546,047.

(51) Int. Cl.
*G06F 40/186* (2020.01)
*G06F 40/166* (2020.01)

(52) U.S. Cl.
CPC ................. *G06F 40/166* (2020.01)

(58) Field of Classification Search
None
See application file for complete search history.

(56) References Cited

U.S. PATENT DOCUMENTS

| 6,560,620 | B1 | 5/2003 | Ching |
| 7,999,951 | B2 | 8/2011 | Ferlitsch |
| 9,372,840 | B1* | 6/2016 | Golchha ................. G06F 40/14 |
| 10,546,047 | B1 | 1/2020 | Michael et al. |
| 2002/0073121 | A1 | 6/2002 | Sano et al. |
| 2004/0194033 | A1 | 9/2004 | Holzwarth et al. |
| 2005/0268230 | A1 | 12/2005 | Bales |
| 2005/0275865 | A1* | 12/2005 | Lee ....................... G06F 3/1204 358/1.13 |

(Continued)

OTHER PUBLICATIONS

Office Action issued for U.S. Appl. No. 13/628,511, dated Nov. 20, 2014, 24 pages.

(Continued)

*Primary Examiner* — Justin S Lee
(74) *Attorney, Agent, or Firm* — Sprinkle IP Law Group

(57) ABSTRACT

Techniques are provided to enable quick previews of what a modified document would look like. In an implementation, a set of page images are stored. Each page image represents a page of a document, the page having been converted to a page image for a first version of the document to permit the document to be viewed in a viewer program. A command is received to modify the document. The requested modification may include, for example, reordering pages, deleting pages, or extracting pages. A preview is generated for a second version of the document. The preview reflects the modification and uses at least one page image from the set of page images created for the first version of the document. Reusing page images allows the preview to be generated very quickly.

24 Claims, 9 Drawing Sheets

(56) References Cited

U.S. PATENT DOCUMENTS

| | | | |
|---|---|---|---|
| 2005/0286063 A1* | 12/2005 | Owen | G06F 3/1208 358/1.13 |
| 2006/0064470 A1 | 3/2006 | Sargent et al. | |
| 2007/0299828 A1 | 12/2007 | Lewis et al. | |
| 2008/0144066 A1* | 6/2008 | Ferlitsch | H04N 1/00222 358/1.13 |
| 2008/0256476 A1* | 10/2008 | Seo | G03G 15/5016 715/772 |
| 2009/0019360 A1* | 1/2009 | Lynggaard | G06F 3/0321 715/243 |
| 2009/0287733 A1 | 11/2009 | Steinhart | |
| 2009/0307579 A1 | 12/2009 | Gelman et al. | |
| 2010/0095197 A1 | 4/2010 | Klevenz et al. | |
| 2010/0229086 A1* | 9/2010 | Howell | G06F 16/9577 715/273 |
| 2010/0313149 A1 | 12/2010 | Zhang et al. | |
| 2011/0019915 A1 | 1/2011 | Roman | |
| 2011/0075200 A1* | 3/2011 | Goldwater | H04N 1/0044 358/1.15 |
| 2011/0295879 A1* | 12/2011 | Logis | G06F 16/9574 707/769 |
| 2012/0050778 A1* | 3/2012 | Shiohara | G06F 3/1256 358/1.13 |
| 2012/0140278 A1* | 6/2012 | Sousa | G06F 3/1256 358/1.15 |
| 2012/0204099 A1 | 8/2012 | Yamada | |
| 2012/0210210 A1* | 8/2012 | Itoh | G06F 40/131 715/236 |
| 2012/0226823 A1* | 9/2012 | Livnat | G06F 21/62 709/246 |
| 2012/0284176 A1 | 11/2012 | Svendsen et al. | |
| 2013/0124478 A1* | 5/2013 | Ginzburg | G06F 40/18 707/639 |

OTHER PUBLICATIONS

Office Action issued for U.S. Appl. No. 13/628,511, dated Apr. 2, 2015, 31 pages.
Office Action issued for U.S. Appl. No. 13/628,511, dated Jul. 30, 2015, 39 pages.
Office Action issued for U.S. Appl. No. 13/628,511, dated Apr. 6, 2016, 44 pages.
Office Action issued for U.S. Appl. No. 13/628,511, dated Oct. 4, 2016, 42 pages.
Office Action issued for U.S. Appl. No. 13/628,511, dated Jul. 11, 2017, 42 pages.
Office Action issued for U.S. Appl. No. 13/628,511, dated Mar. 7, 2018, 46 pages.
Office Action issued for U.S. Appl. No. 13/628,511, dated Nov. 6, 2018, 49 pages.
Office Action issued for U.S. Appl. No. 13/628,511, dated Mar. 19, 2019, 60 pages.

* cited by examiner

METHOD AND SYSTEM FOR STASHING OF DOCUMENT ALTERATION INFORMATION FOR QUICKER WEB PREVIEW

CROSS-REFERENCE TO RELATED APPLICATION

This application is a continuation of, and claims a benefit of priority under 35 U.S.C. 120 of the filing date of U.S. patent application Ser. No. 13/628,511 filed Sep. 27, 2012, issued as U.S. Pat. No. 10,546,047, entitled "METHOD AND SYSTEM FOR STASHING OF DOCUMENT ALTERATION INFORMATION FOR QUICKER WEB PREVIEW", the entire contents of which are hereby expressly incorporated by reference for all purposes.

BACKGROUND

The present invention relates to the field of information technology, including, more particularly, to systems and techniques for document management.

Many companies turn to document management systems to help them store and manage their electronic documents. In some cases, a user will want to make modifications or alterations to the document. The process of modifying the document can take a significant amount of time and computing resources-especially if the document has many pages that need to be processed to complete the modification. Users may be left sitting at a blank screen for a long time while the system processes their modification request. This is generally undesirable.

Thus, there is a need to provide systems and techniques to improve the perceived response time of document modification operations.

DETAILED DESCRIPTION

Figure 1:
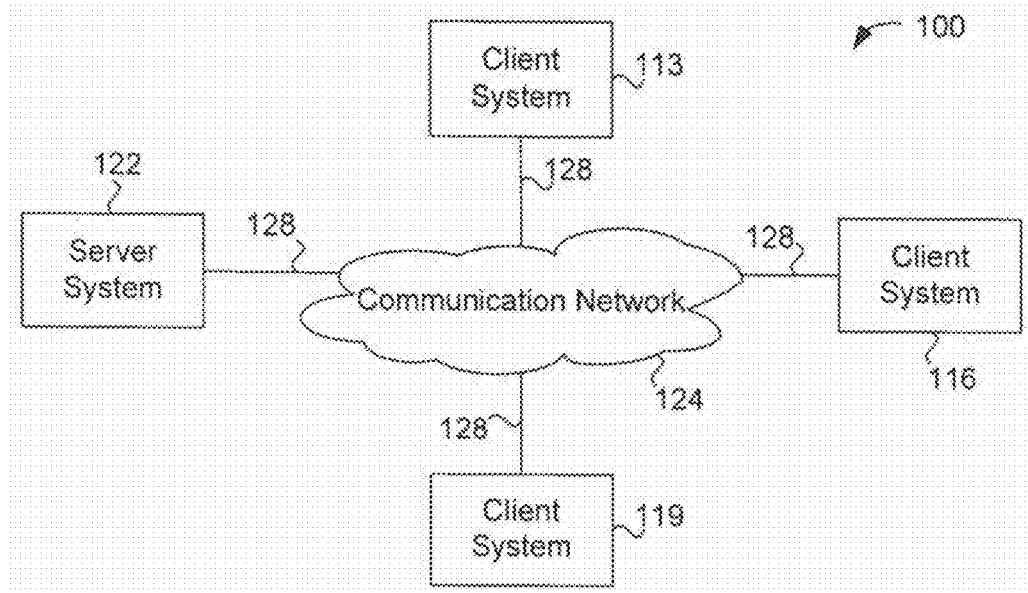
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
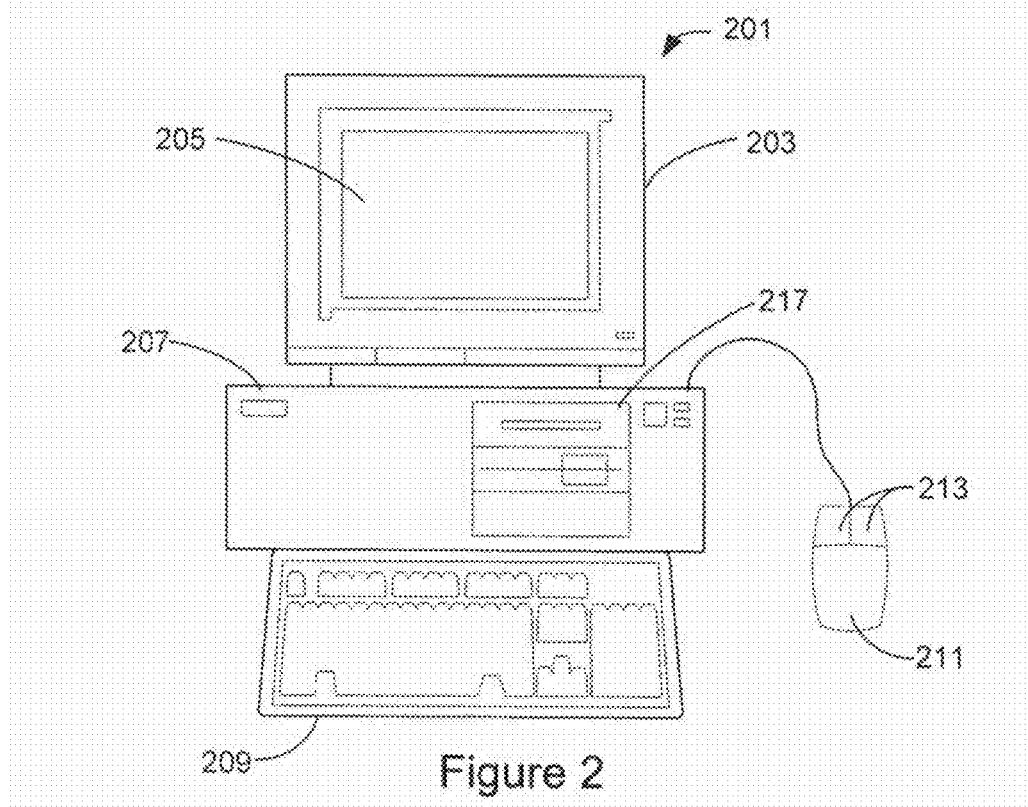
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
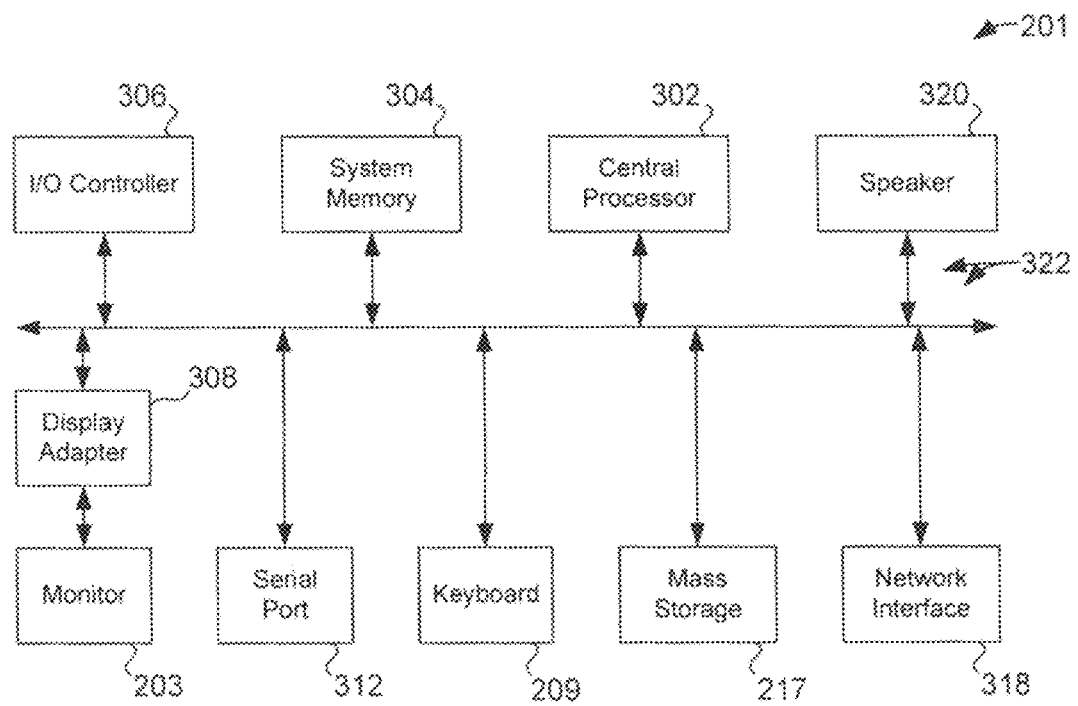
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from Math Works), SAS, SPSS, JavaScript®, AJAX, Java®, SQL, and XQuery (a query language that is designed to process data from XML files or any data source that can be viewed as XML, HTML, or both).

The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
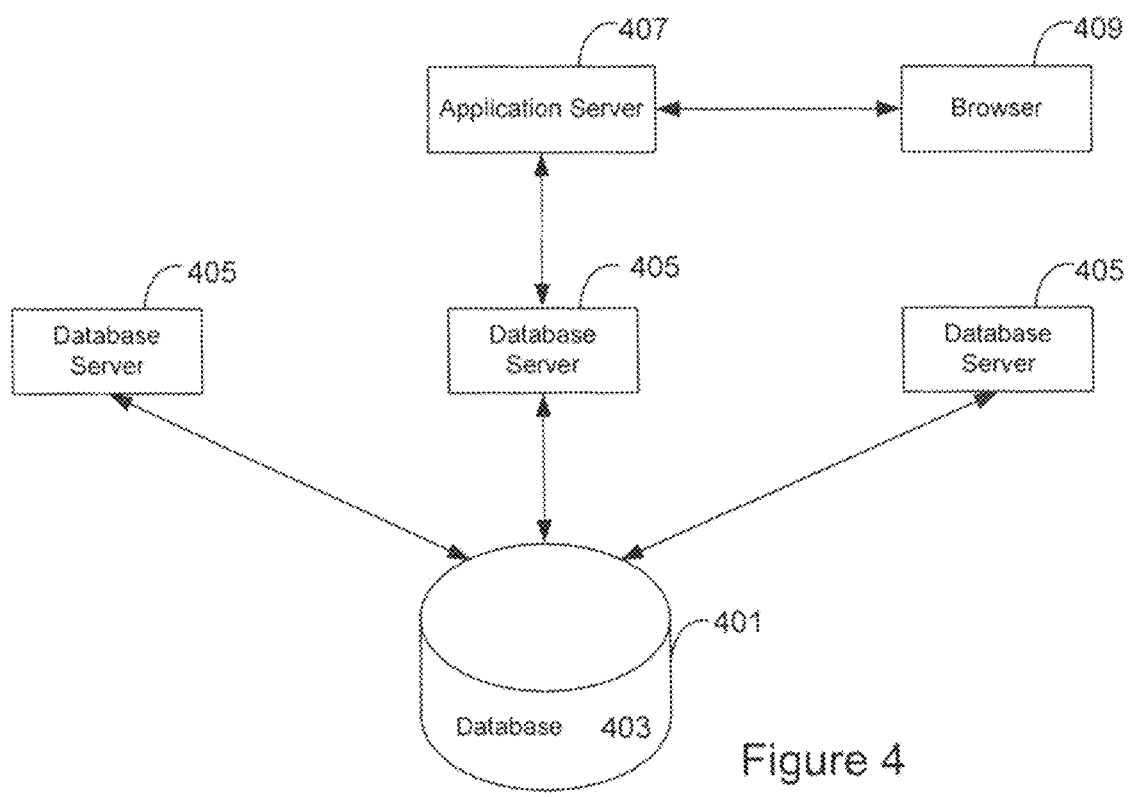
FIG. 4 shows a data source or data service in the form of a database system.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 mayor may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
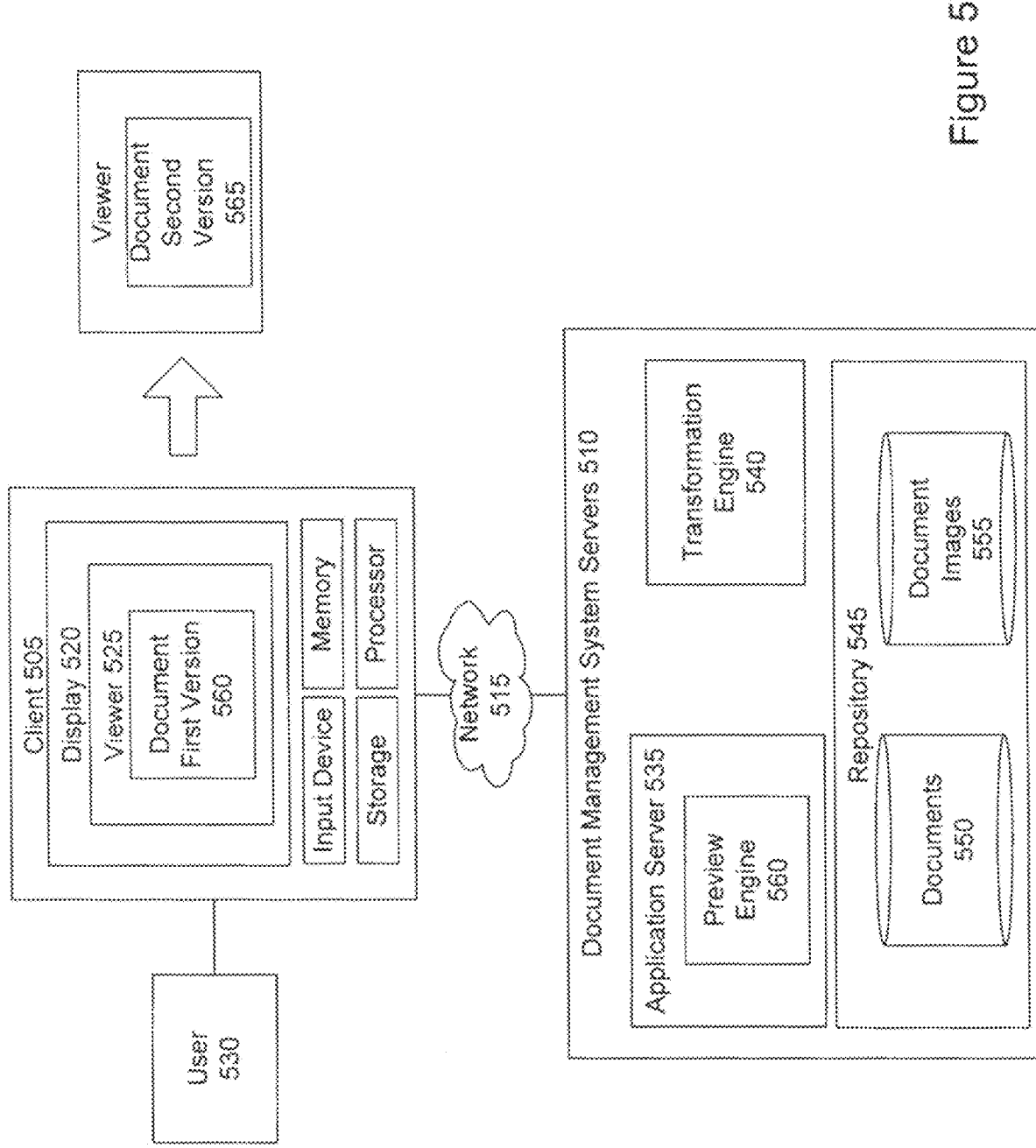
FIG. 5 shows a block diagram of a system for document management.

FIG. 5 is a block diagram showing a system for document management. The document management system helps organizations such as companies, governments, and other entities track and store documents in a central repository. An embodiment of the invention provides clients with a quick preview of what a document will look like after a user applies (e.g., confirms) a modification to the document. In a specific implementation, a modification includes reordering pages in the document, deleting pages in the document, extracting pages into another document, or combinations of these. The preview is designed to simulate or emulate what a new version of the document would look like to give the appearance of the document modification having been completed. Completing a document modification can involve a significant amount of processing and time. Techniques of the invention allow the preview to be quickly generated so that users can quickly see results while the document modification continues to be processed.

This system may include any number of clients, such as a client 505. The clients access a server system 510 via a network 515. The network is as shown in FIG. 1 and described above. The clients are general purpose computers with hardware and software, such as shown in FIGS. 2-3 and described above. For example, client 505 includes a display 520, an application program 525, a processor, memory, storage, and an input device (e.g., mouse, keyboard, stylus, or touchscreen). The application program may be referred to as a viewer or document viewer program. The application program can request, receive, and process data from a user 530, the server system, or both. The data can be shown via the display.

Server system 510 includes components similar to the components shown in FIGS. 3-4 and described above. In a specific implementation, the system includes an application server 535, a transformation engine 540, and a repository or storage 545. The storage includes databases 550 and 555. The application server is responsible for receiving requests from the clients and delivering documents and other data from storage to the clients. A preview engine 560 of the application server is responsible for generating a preview of what a document will look like after a modification, i.e., simulating the modification. The application server may include a web server to deliver Web pages from storage to the clients.

Database 550 stores documents. The documents can include documents that have been uploaded or imported into the system from the clients. The documents can include documents created using word processing programs (e.g., Microsoft Word files, Corel WordPerfect files), presentation programs (e.g., Microsoft PowerPoint files), spreadsheet programs (e.g., Microsoft Excel files, Apple Numbers files), drawing programs (e.g., Microsoft Visio files, or Autodesk AutoCAD files), collaboration programs, note-taking programs (e.g., Microsoft OneNote), project management programs (e.g., Microsoft Project, Oracle Primavera, or Adobe Portable Document Format (PDF) files)—just to name a few examples. Typically, the documents stored in database 550 will have been authored using third-party software (e.g., Microsoft Word) and will have a propriety format (e.g., ".doc" (Microsoft Word), ".ppt" (Microsoft PowerPoint), or ".xls" (Microsoft Excel)).

The transformation engine is responsible for converting the documents stored in database 550 from a format not capable of being displayed by application or viewer program 525 into a format that is capable of being displayed by the application program. In a specific implementation, the format is an image file format (e.g., JPEG File Exchange Format). Other examples of image file formats include Exif (Exchangeable Image File Format), TIFF (Tagged Image File Format), GIF (Graphics Interchange Format), PNG (Portable Network Graphics), WebP, and others. The converted documents are stored as document images or page images in database 555.

In a specific implementation, application program or viewer program 525 is a Web browser application program. The user, through the Web browser, can view the images of documents stored in database 555 and make modifications (e.g., reorder pages, delete pages, or extract pages). Aspects of the invention, however, may be implemented in any type of viewer program, not just a Web browser, that is capable of downloading and displaying the document images and receiving input to make the modifications. The viewer may be implemented as a plug-in to the Web browser. The viewer may be an application program separate from the Web browser application program. The viewer may execute separately from the Web browser application program. The viewer may be installed separately from the browser. Typically, the viewer will be an application program that is different from the application program that the document was originally authored in. With the viewer installed at the client, the document can be viewed even if the application used to originally create or author the document is not installed at the client.

Preview engine 560, upon receiving a command to modify a version 560 of a document shown within the viewer program (e.g., Web browser), generates a preview 565 of what a new version of the document would look like. In a specific implementation, the preview engine generates the preview by using one or more document page images that were used to display the version, i.e., previous version, of the document. This allows the preview to be generated very quickly because the page images are existing page images.

More particularly, in a specific embodiment, in a web application, previewing document contents can involve using renditions of a document that can be supported by the browser. A quick response time is desirable or expected for any user operation involving this content—even in resource heavy operations like modification operations like a reorder, delete or extracting some pages into a new document.

In a web application that uses the browser to display content, it is generally not possible to display all formats (e.g., Microsoft Office formats like Word, Excel, PowerPoint documents) directly in the browser inside an html page. So, the documents are converted to a web supported format for display. In this specific implementation, the document is converted into to a series of images (proxies for the pages) which can then be loaded on screen to simulate viewing and navigating the document content. This is done via the document transformation engines.

In the event of modification operations involving the document, the document content is first modified and then the transformation engine generates a series of new images for the modified content. Modification operations are typically of two types. One involves actual content modification, example changing the text content or adding images. The other involves manipulating content like a page reorder, deleting of certain pages or extracting some pages of the document into another document. In a specific implementation, the preview engine supports modifications of the second type. Aspects of the invention, however, can be applicable to modifications of the first type.

In a specific embodiment, the user can initiate a modification of the document from an action on the browser user interface (UI). Once the action is initiated, on the server the document content is modified and then new the series of image content is created. Modifying the content and then processing web friendly renditions for the modified content can be a time consuming as well as CPU heavy operation. This would result in the user having to wait for a long time to ultimately view the document in the browser because the user has to wait for the document to be modified and the series of images to be generated after a modification operation. In other words, the user waits for both the modification of the content and the generation of the series of images to complete. This could take a long time depending on the size of the document. Until this is complete the document would not be able to be viewed from within the browser. It is desirable to have quicker response time for the users and reduce the impact of the CPU heavy operations. This would mean that the user would get to see the end result of the operation much quicker and not have to be paused in his activity.

In a specific implementation, a feature of the invention includes reusing information available from previous versions of the document in applicable scenarios. When a new version of a document is created, the older version of the document is still available in the content repository and with it its web-ready image series. In scenarios of content modification which involve reordering, deleting some pages, extracting pages into another document the images created for the previous versions remain the same. What has changed is the order. Keeping this information ready allows simulating the document preview without having to wait for any of the other heavier operations to complete.

Figure 6:
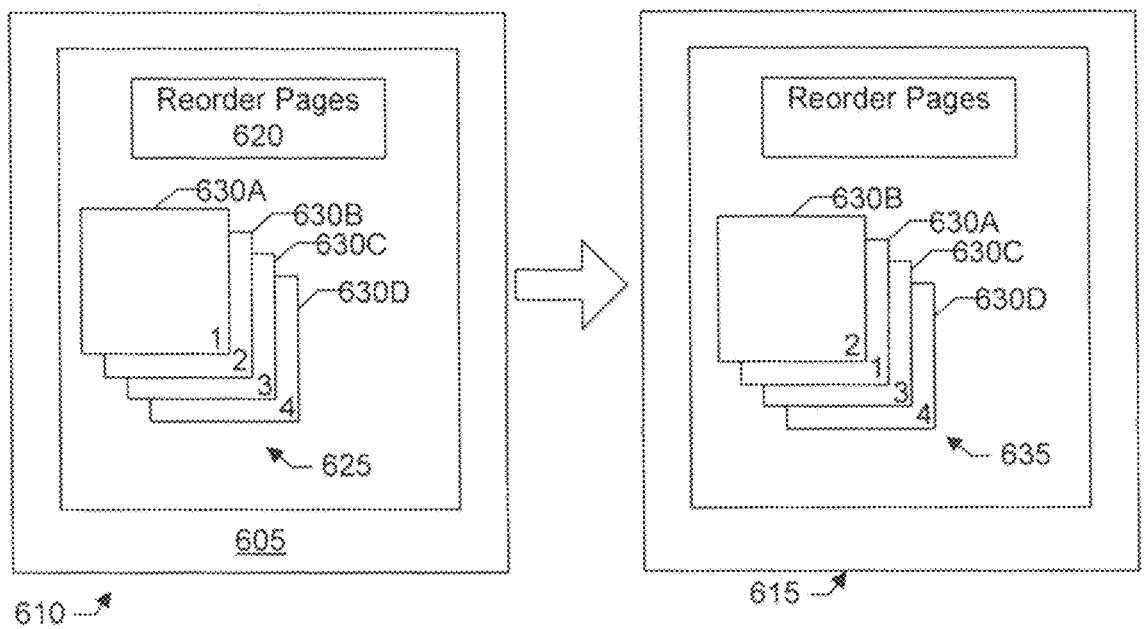
FIG. 6 shows an example of reordering pages.

FIGS. 6-10 each show a sequence of the document modification operations for reorder pages, delete pages, and extract pages, respectively. Referring now to FIG. 6, a viewer program 605 is shown in an initial display state 610 and in a subsequent display state 615 after a user applies a document modification operation 620. The initial display state includes a particular version 625 of a document being displayed as a set of document page images, each page image corresponding to a page in the document and having been created for the particular version.

A first page image 630A corresponds to a first page of the document. A second page image 630B corresponds to a second page of the document. A third page image 630C corresponds to a third page of the document. A fourth page image 630D corresponds to a fourth page of the document. The page images include a representation of or a rendition of the content on the page in the document. For example, depending on the content on the page, the page image can include text, graphics (e.g., pictures, photographs, charts, or drawings), or both.

In the figure, the page images are shown as a stack of partially overlapping pages to indicate their order as they would appear in the particular version of the document. Thus, in this version the second page appears after the first page. The third page appears after the second page. The fourth page appears after the third page. Conversely, the third page appears before the fourth page. The second page appears before the third page. The first page appears before the second page.

It should be appreciated that the illustration of a stack is merely for purposes of explanation. Other graphical techniques can be used to illustrate pages and page order. For example, the page images may be displayed on a graphical user interface (GUI) as column of thumbnail page images. A thumbnail page image that is displayed above another thumbnail page image indicates that a page represented by the upper thumbnail image appears in the document before a page represented by the lower thumbnail image. Alternatively, the thumbnail page images may be arranged as a set of tiles as in a grid, table, or matrix.

The user, through the viewer program, can select a modification option 620 to reorder the pages (e.g., move the first page so that it is after the second page). This can involve, for example, using a mouse to drag the first page image to a position between the second and third page images, entering the new page order in a graphical input box, or both. The user, upon applying or confirming the page reorder modification, is presented with a preview 635 of what a new version of the document would look like. The preview reflects the modification. In the example shown in FIG. 6, the user has decided to move the first page so that it is after the second page. Thus, as shown in subsequent display state 615, second page image 630B is shown as being above or before first page image 630A. That is, first page image 630A is shown as being after second page image 630B.

Figure 7:
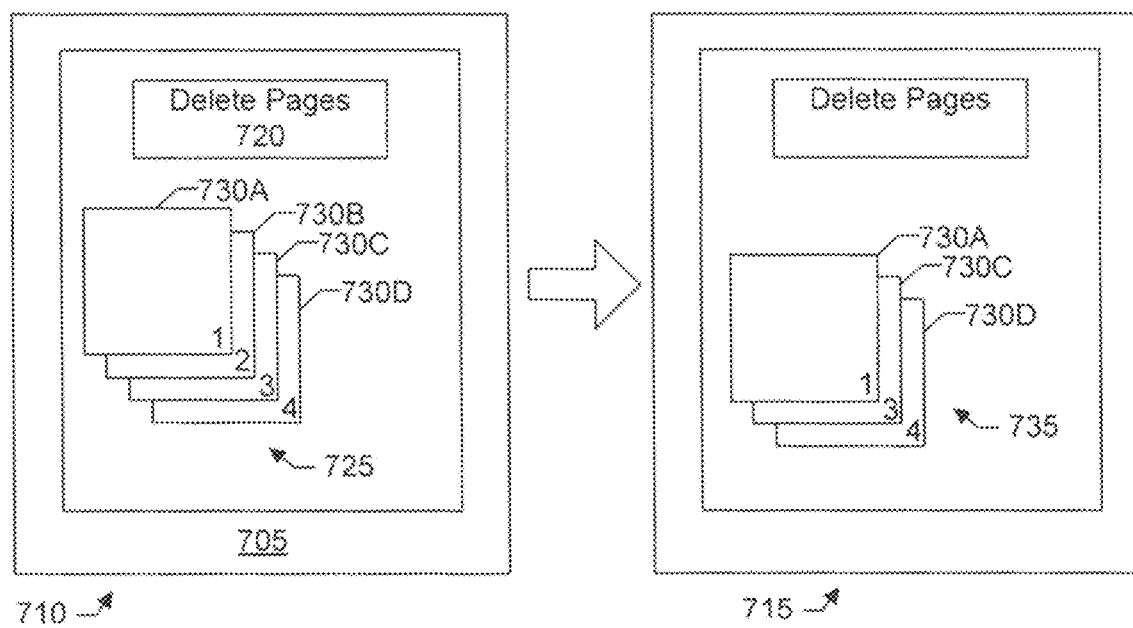
FIG. 7 shows an example of deleting pages.

FIG. 7 shows an example of deleting pages. FIG. 7 is similar to FIG. 6. For example, a viewer 705 is shown in an initial display state 710 and in a subsequent display state 715 after a user applies a document modification operation 720. The initial display state includes a particular version 725 of a document being displayed as a set of document page images. A first page image 730A corresponds to a first page of the document. A second page image 730B corresponds to a second page of the document. A third page image 730C corresponds to a third page of the document. A fourth page image 730D corresponds to a fourth page of the document.

The user can select modification option 720 to delete one or more pages of the document. Upon the user applying the modification, the system presents the user with a preview 735 of what a new version of the document would look like. In the example, shown in FIG. 7, the user has decided to delete the second page. Thus, as shown in subsequent display state 715, there is first page image 730A, third page image 730C, and fourth page image 730D. Second page image 730B, however, is omitted.

Figure 8:
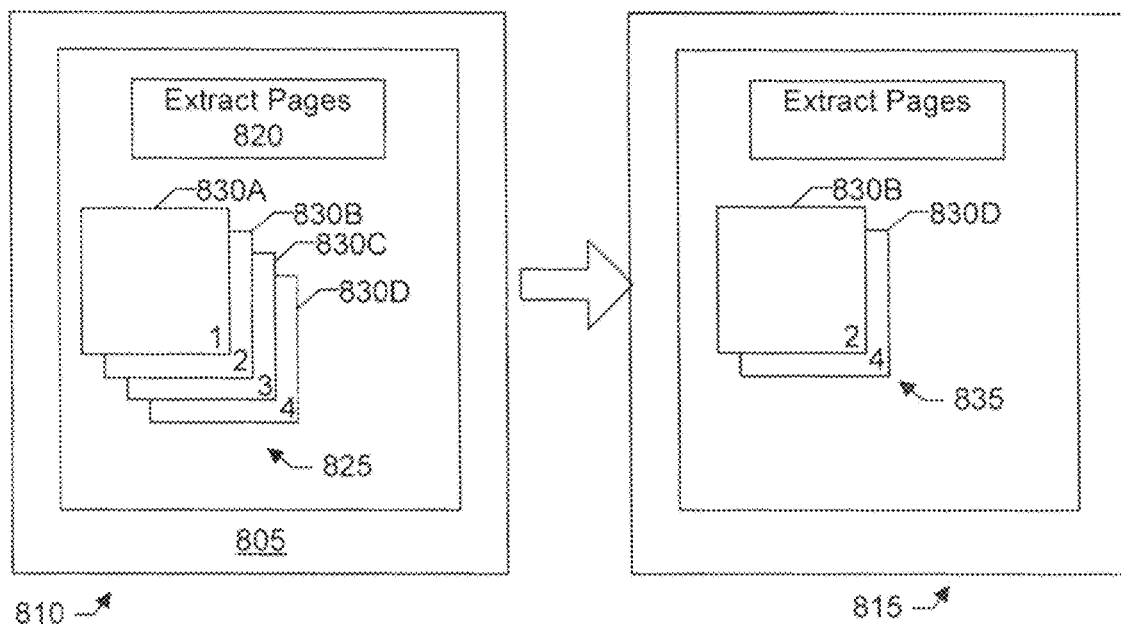
FIG. 8 shows an example of extracting pages.
Figure 9:
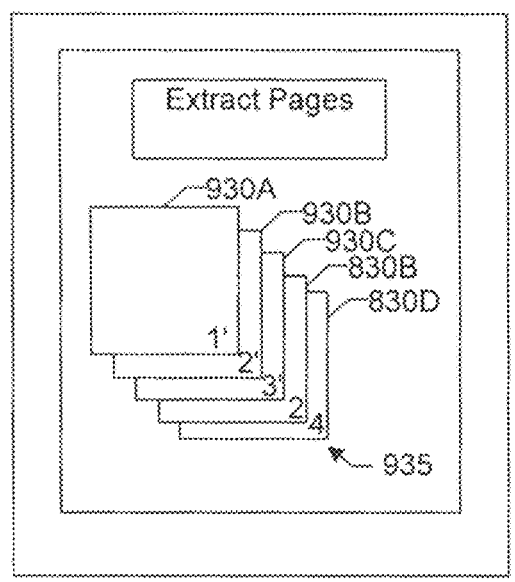
FIG. 9 shows another example of extracting pages.
Figure 10:
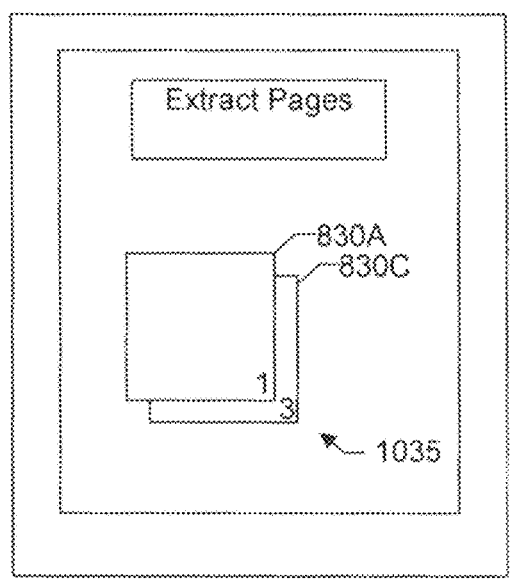
FIG. 10 shows another example of extracting pages.

FIG. 8 shows an example of extracting pages. FIG. 8 is similar to FIG. 6. For example, a viewer 805 is shown in an initial display state 810 and in a subsequent display state 815 after a user applies a document modification operation 820. The initial display state includes a particular version 825 of a document being displayed as a set of document page images. Page images 830A-830D correspond to first, second, third, and fourth pages, respectively, of the document.

The user can select modification option 820 to extract one or more pages of the document and insert the pages into another document. The document from which the pages are extracted from may be referred to as a source document. The document into which the extracted pages will be inserted may be referred to as a destination document. The destination document may be an existing document or may be a new document that is created with the extraction. Upon the user applying the modification, the system presents the user with a preview 835 of what a new version of the document would look like.

In a specific implementation, the preview is of the destination document. In the example shown in FIG. 8, the user has decided to extract the second and fourth pages to create a new document version with the extracted pages. Thus, as shown in subsequent display state 815, the preview includes second page image 830B and fourth page image 830D. Alternatively, the user may decide to insert the extracted pages into an existing destination document. For example, referring now to FIG. 9, there is a preview 935 showing what a new version of an existing destination document would look like with the insertion. In this example, page images 930A-930C represent page images of the existing destination document. Page images 830B and 830D are the page images representing pages of the source document.

The extracted pages can be inserted anywhere within the destination document. A user may specify that the extracted pages are to be inserted after the last page, inserted before the first page, or inserted at another user-specified position, order, location, or point between the first and last pages.

In another specific implementation, the user may decide to delete the extracted pages from the source document and the preview may show what a new version of the source document would look like. For example, referring now to FIG. 10, in this example, the user has decided to delete the extracted pages from the source document. A preview 1035 shows what a new version of the source document would look like. The preview includes first page image 830A and third page image 830C, but not second and fourth page images 830B and 830D.

As discussed above, a specific implementation includes the document modification operations reorder pages, delete pages, and extract pages. In other implementations, other types of document modification operations are supported such as merging two or more documents, inserting pages, inserting documents, or both.

Figure 11:
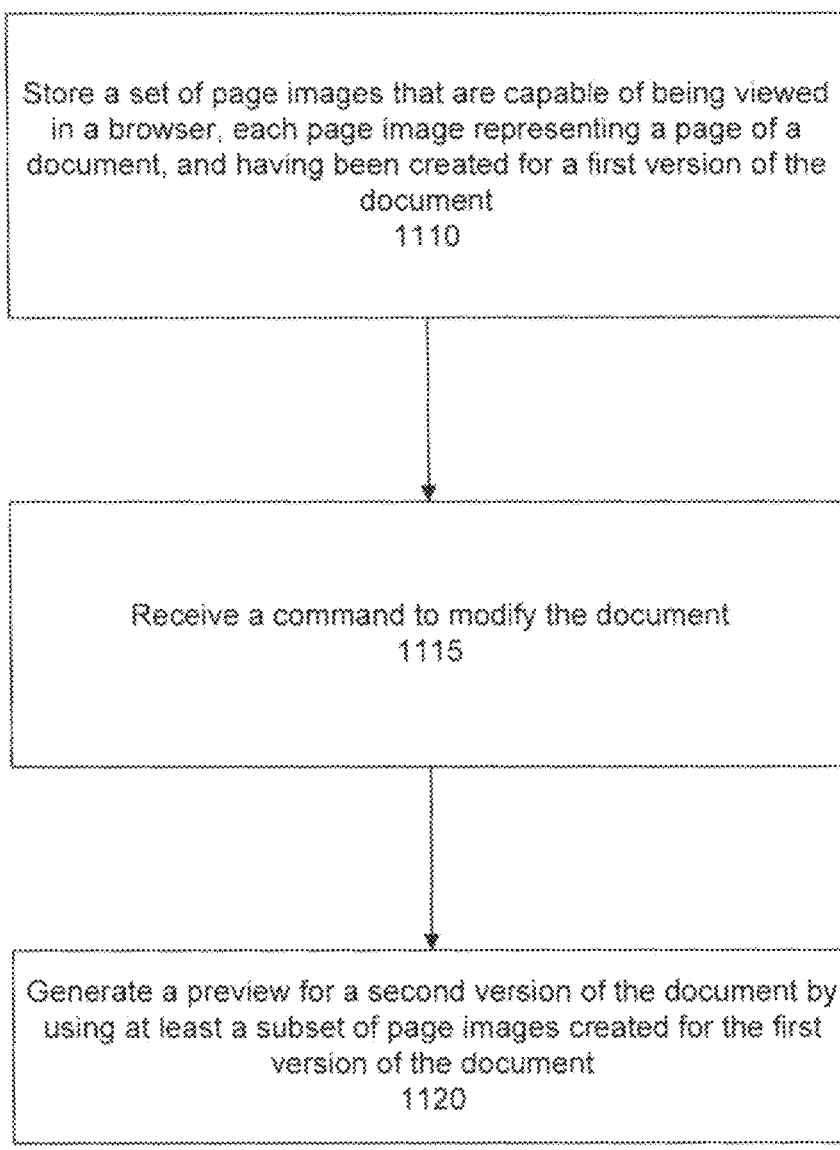
FIG. 11 shows an overall flow for reusing page images.

FIG. 11 shows an overall flow 1105 for generating document previews, i.e., simulating what a new version of a document would look like with the modification. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In a step 1110, the system stores a set of page images such as in database 555 (FIG. 5). The page images are the result of converting (e.g., transforming) a document into a format (e.g., image format) capable of being viewed in a viewer application program (e.g., a Web browser application program). Each page image includes a representation of content from a page of a document, and is created for a first version of the document. The user can access the desired document version using the viewer program. The document page images of the document are then displayed within the viewer program.

In a step 1115, the system receives a command to modify the document. As discussed above, in a specific implementation, the viewer program allows the user to make modifications to the document (e.g., reorder pages, delete pages, or extract pages-see FIGS. 6-10 and discussion accompanying the figures).

In a step 1120, upon the user applying the desired modification to the document, the system generates a preview for a second or new version of the document where the preview reflects the modification. That is, the system simulates or provides a logical representation of what the second version of the document would look like. In a specific implementation, the preview for the second version is generated by using at least one page image from the set of page images that were generated for the first version of the document.

The preview can be generated very quickly because the system reuses existing page images, i.e., the page images created for the first version of the document. In this specific implementation, the preview is generated before the second version of the document (with the modification) is created. The preview for the second version of the document may be displayed within the browser during the processing of the document modification for the second version of the document. That is, the preview for the second version of the document may be displayed while the second version of the document is being generated or processed.

Depending on the document operation the user applied, the preview may include all the page images generated for the first version of the document. But, a page order of the page images in the preview may be different from a page order of the page images in the first version. The preview may include at most a subset of page images generated for the first version.

Figure 12:
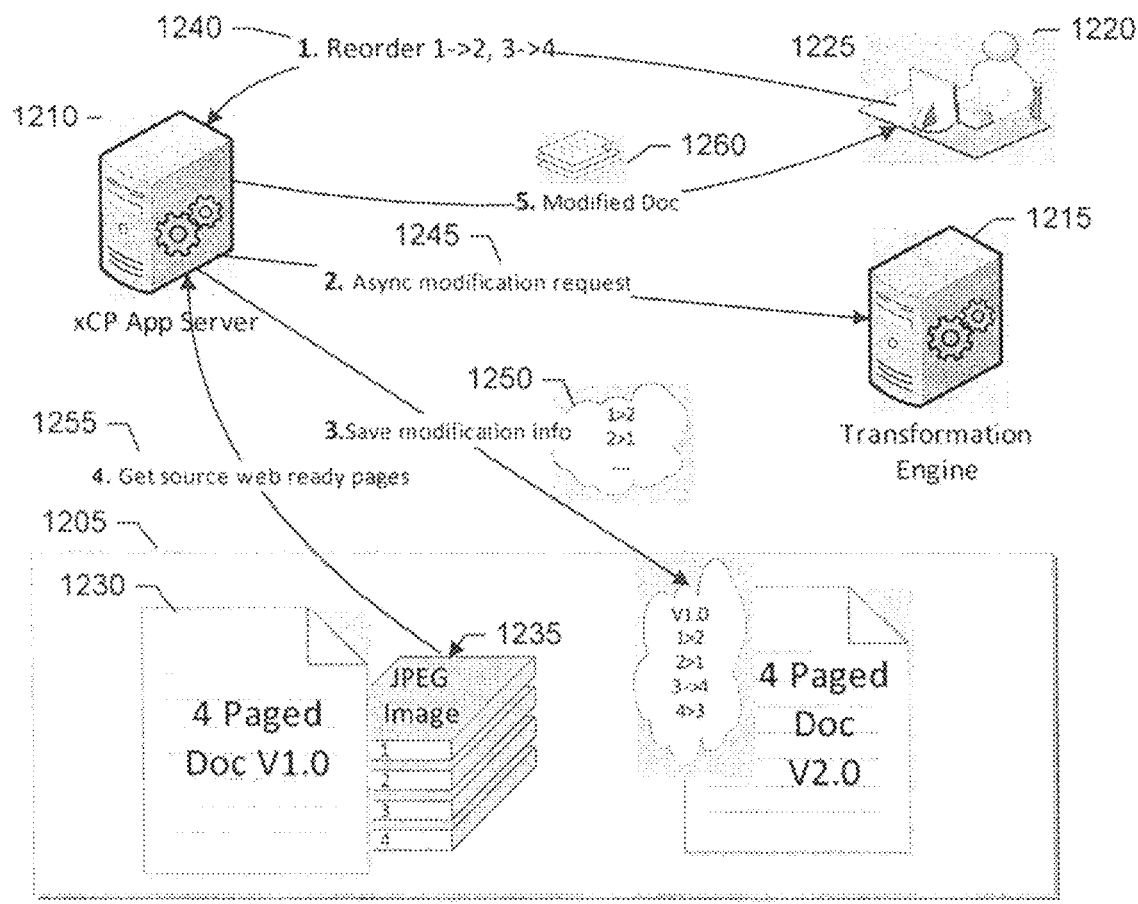
FIG. 12 shows a block diagram of a specific implementation of a system for reusing page images.
Figure 13:
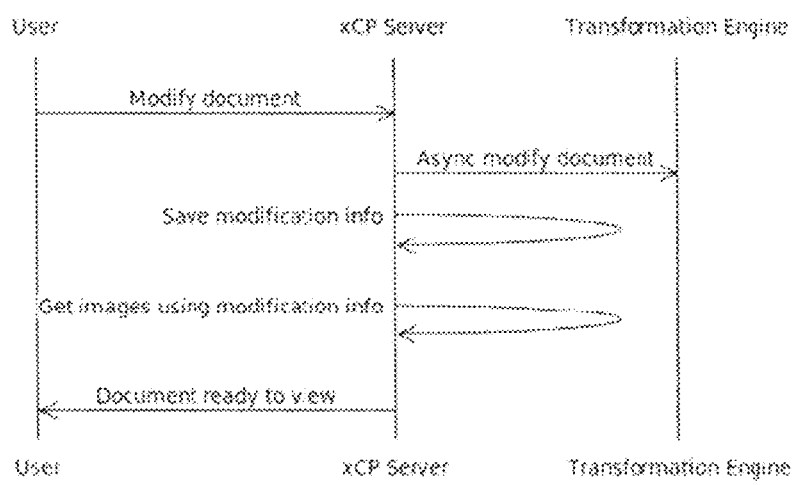
FIG. 13 shows a process diagram of the specific implementation of the system for reusing page images.

FIGS. 12-13 show schematics for a specific implementation of a system to enable reuse of existing page images. FIG. 12 shows a document management system. FIG. 13 shows an overall process diagram of the system. Referring now to FIG. 12, there is a document or content repository 1205, a server 1210, a transformation engine 1215, and a user 1220 at a client machine having a viewer application program 1225. The transformation engine, repository, or both may be part of the server or separate from the server, such as part of another server or spread across multiple servers. The repository stores a document such as a Microsoft Word document 1230 and the results of the document having been processed by the transformation engine, i.e., page images 1235 (e.g., JPEG images). The page images correspond to the pages of the document and can be viewed by the client viewer application program (e.g., Web browser).

The user, while viewing page images 1235, applies a document modification operation 1240 (e.g., reorder the pages so that page 1 is after page 2, and page 3 is after page 4). The server receives the command to modify the document and issues an asynchronous modification request 1245 to the transformation engine. In this specific implementation, when the document modification operation is invoked (1240) the system creates a data structure 1250 to model the structure of the modified document with a mapping to the existing information on the older version. Some examples of data structures include arrays, records, lists, hashes, trees (e.g., binary trees, b-trees, heaps, tries, multiway trees, space-partitioning trees), and graphs.

In this specific implementation, the data structure information maps the information from the older document to the new. In the example shown in FIG. 12, the data structure maintains information of, for example, the reordering, e.g., page one is moved to the second position and page three to four from the first version of the document. This information is used to simulate the web-ready image series for the new document.

The system consults the data structure to determine which of the previous page images should be reused to simulate a modified document and the order in which the page images should appear. Based on the data structure, the server receives 1255 the appropriate page images for the modified document preview. The page images are then transmitted 1260 to the viewer where they are displayed and ordered according to user's selected modification.

Consider the following example. A user is trying to view a document modified several seconds ago. The browser sends a request to the application server to retrieve the web ready images of the document, but notices that they're not yet ready. The application then notices that there is this other information available which it can use—the saved data structure. D sing this information it is able to construct information about the web-ready image series of the newly modified document. This information is kept available until the transformation engine has complete processing of the web-ready images for the new version. After that it is removed (e.g., deleted). Deleting the data structure helps to free-up system resources (e.g., storage).

EMC Documentum xCP is one example of a specific implementation of the invention. EMC Documentum xCP is provided by EMC Corporation of Hopkinton, Mass. In this specific implementation, the data structure information is stored using Documentum Aspects on the newly created document. An aspect is attached on the newly modified document which contains information on the new document and how it has been modified from the older document. Once it is known that the Content Transformation Service (the transformation engine) has completed creating the web-ready images for a document, the aspect can be removed from the document.

This approach avoids making the user wait for the processing engine to complete modification of the newer version of the document and then waiting for the generation of the web-ready image content. Completing the modification and generating web-ready image content can take a very long time especially for documents that run into tens of thousands of pages. In previous approaches, any time a user navigated to a document that was recently modified, the user needed to wait a very long time. This was because that new version of the document did not have its modification and web compliant images ready. If the wait time was unacceptable, a suggestion was made to upgrade hardware to increase the speed of processing operations. Purchasing new hardware, however, can be expensive.

Some advantages and benefits of the new techniques as discussed in this patent application include the following. One benefit is that the user gets rapid feedback on the modification operation that was initiated. This means being able to quickly see what the new document looks like as the approach re-uses the image content it has from the previous version of the document. Another benefit is an increase in the perceived response time without having to upgrade the hardware for the transformation engine. In this specific implementation, the system does not wait for the transformation engine to complete the modification operation, check-in the transformed modified document in the repository, and then notify the server that the modification is complete and the modified document ready to view. Rather, the processing can occur in the background.

Figure 14:
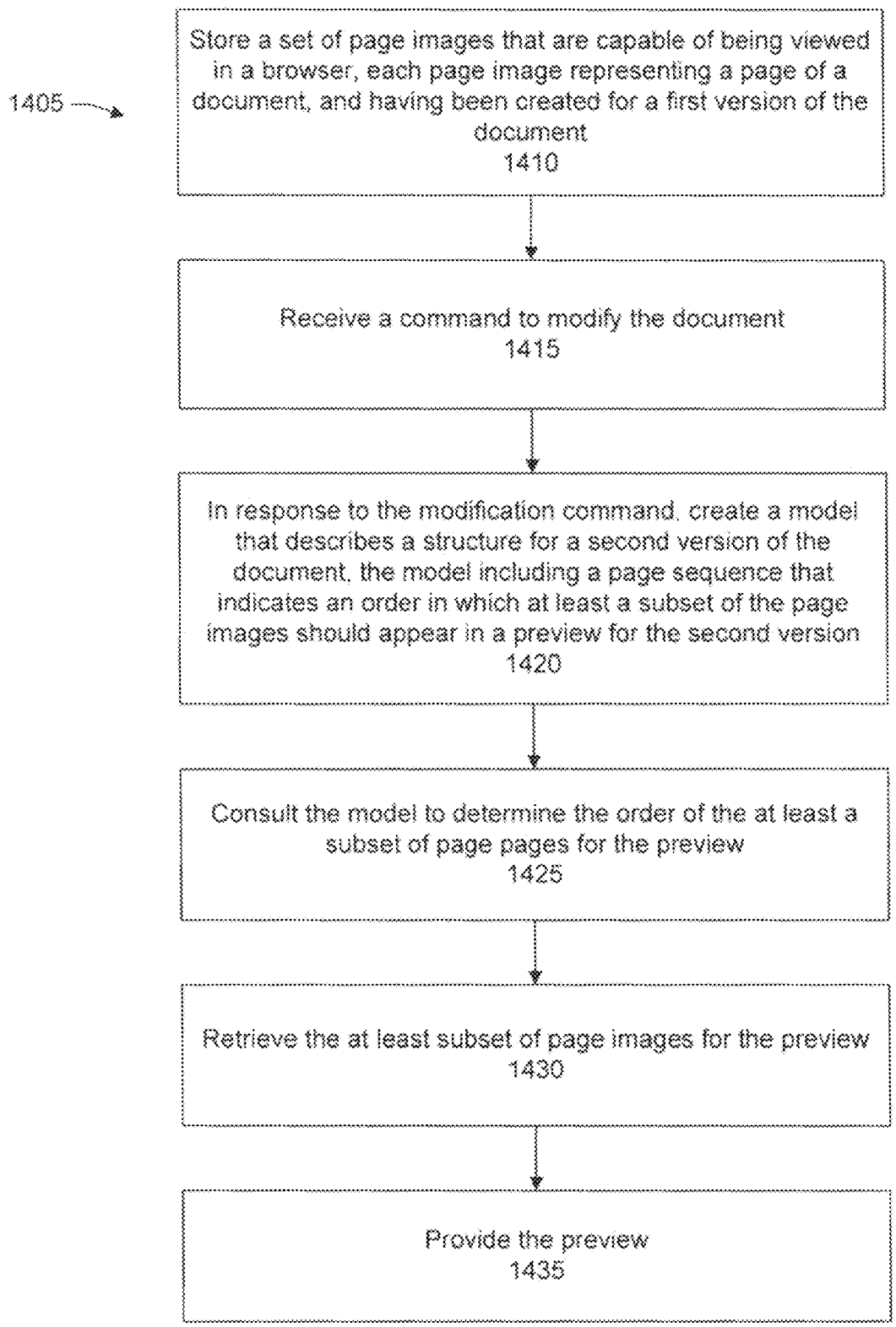
FIG. 14 shows an overall flow of the specific implementation of the system for reusing page images.

FIG. 14 shows a flow 1405 of a specific implementation of system for reusing existing page images to simulate a modified (e.g., changed or altered) document. In a step 1410, the system stores a set of page images capable of being viewed in a viewer program, each page image representing a page of a document, and having been created for a first version of the document. In a step 1415, the system receives a command or request to modify the document. Steps 1410 and 1415 are similar to steps 1110 and 1115, respectively, as shown in FIG. 11 and described above.

Figure 15:
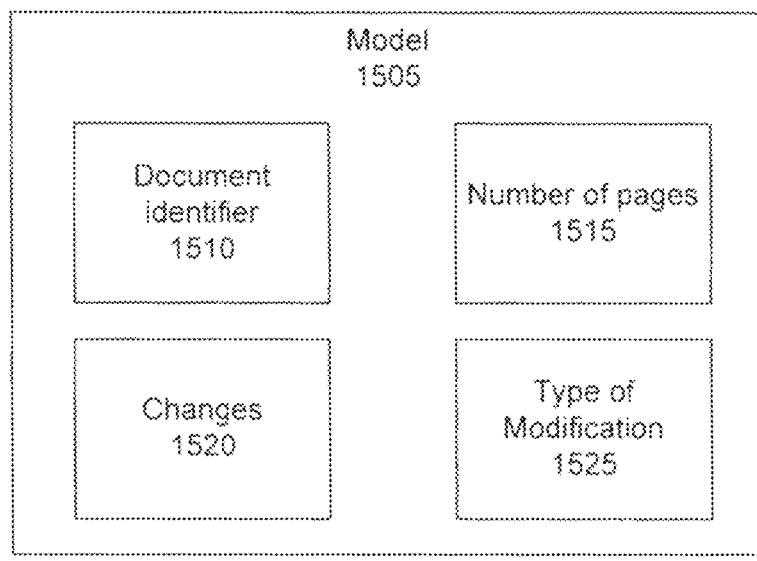
FIG. 15 shows a model that describes a structure for a new version of the document based on the modifications.

In a step 1420, in response to the user's modification command, the system creates a model (e.g., data structure) that describes a structure of a second version of the document. The model includes a page sequence that indicates an order in which at least a subset of the page images should appear in a preview of the second version of the document. FIG. 15 shows a block diagram of a model 1505 and the information that may be stored in the model to enable the mapping (e.g., page mapping) between the first version of the document and a second version of the document that will be created. As shown in FIG. 15, the model can include a document identifier 1510 for the first version of the document, a number of pages 1515 in the first version of the document, the user's desired changes 1520 (e.g., modifications or alterations) to the first version, and a type of the document modification 1525 (e.g., reorder pages, delete pages, or extract pages).

Referring now to FIG. 14, in a step 1425, the system consults the model to determine an order in which the at least a subset of page images created for the first version of the document should appear in the preview for the second version of the document. For example, in the case of a page reorder operation, the model may have information indicating that a page appearing as a first page in the first version of the document should appear as a second page in the preview. In the case of a page deletion operation, the model may have information indicating that a page appearing in the first version of the document should not appear in the preview, the page having been deleted.

The model can include a mapping that maps a first location or position of a page in the first version of the document to a second location or position of the page in the second version of the document. The mapping can include a first sequence of page numbers for the first version of the document, and a second sequence of page numbers for the second version of the document. An order of the page numbers in the first sequence indicates a reading order of the pages for the first version of the document. An order of the page numbers in the second sequence indicates a reading order of the pages for the second version of the document. The mapping can include a cross referencing of the pages in the first sequence to the pages in the second sequence.

Depending on the document modification operation, the number of pages in the preview may be less than, greater than, or equal to the number of pages in the first document version. For example, in the case of a page reorder operation, the number of pages in the preview and first version will be equal. In the case of a page deletion operation, the number of pages in the preview will be less than the number of pages in the first version.

In a step 1430, the system retrieves from the repository the at least a subset of page images specified in the model for the preview. The page images may be identified using a page image identifier such as a uniform resource locator (URL). In a step 1435, the system provides the preview to the user. For example, the at least a subset of page images and information indicating the order in which they should appear in the preview may be transmitted to the client for display.

In a specific implementation, techniques are provided to enable quick previews of what a modified document would look like. In an implementation, a set of page images are stored.

Each page image represents a page of a document, the page having been converted to a page image for a first version of the document to permit the document to be viewed in a viewer program. A command is received to modify the document. The requested modification may include, for example, reordering pages, deleting pages, or extracting pages. A preview is generated for a second version of the document. The preview reflects the modification and uses at least one page image from the set of page images created for the first version of the document. Reusing page images allows the preview to be generated very quickly.

In a specific implementation, a method includes storing a plurality of page images that are capable of being viewed in a Web browser application program, each page image representing a page of a document, and having been created for a first version of the document, receiving a command to modify the document, and generating a preview for a second version of the document, wherein the preview reflects the modification and includes at least one page image from the plurality of page images created for the first version of the document. The command to modify the document may include at least one of reordering pages, deleting pages, or extracting pages.

In a specific implementation, the method further includes upon the receiving a command, creating a model that describes a structure for the second version of the document, and consulting the model to determine where the at least one page image should appear in the preview of the second version. The model comprises a page sequence that indicates an order in which at least a subset of page images of the plurality of page images created for the first version should appear in the second version, the subset including the at least one page image.

The method may further include creating the second version of the document based on the modification, and after the creating the second version, deleting the model. In an implementation, the document is originally authored using an application program different from the Web browser application program. In an implementation, the preview for the second version of the document is generated before the second version of the document is created.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

The invention claimed is:

1. A method comprising:
storing a first document according to a first file format in a repository of a document management system, the first document comprising a first plurality of pages;
transforming the first document into a first set of page images and storing the first set of page images in the repository of the document management system, the first set of page images formatted according to an image format that is browser compatible, each page image in the first set of page images representing a different corresponding page from the first plurality of pages;
transmitting the first set of page images to a client computer for display within a viewer application;
receiving a modification command from the viewer application to modify the first document, the modification command indicating a modification to the first document that indicates a change in a page sequence;
based on the modification command, applying the modification to the first document to create a new document version reflecting the modification;
prior to creating the new document version:
creating a data structure modelling a document structure for the new document version, the data structure including a page mapping to information of the first document, wherein the page mapping maps a first page location in the first document to a second page location in the new document version that reflects the change in page sequence;
using the data structure to determine a subset of the first set of page images to reuse for a preview of the new document version, wherein the preview of the new document version uses the same page images that are stored in the repository and were transmitted to the client computer and that belong to the subset;
generating the preview of the new document version to simulate what the new document version would look like with the modification applied to the first document, the preview of the new document version including the subset of the first set of page images; and
transmitting the preview of the new document version to the viewer application for display.

2. The method of claim 1, wherein the preview of the new document version is transmitted to the viewer application for display during processing of the modification to create the new document version.

3. The method of claim 1, wherein transmitting the preview of the new document version to the viewer application comprises transmitting the subset of page images and information indicating an order in which the subset of page images should appear.

4. The method of claim 1, wherein the first set of page images are generated for a first version of the first document and the new document version is a second version of the first document.

5. The method of claim 1, further comprising destroying the data structure based on a determination that the new document version has been created.

6. The method of claim 1, wherein creating the new document version comprises storing the new document version in the repository according to the first file format.

7. The method of claim 6, further comprising:
transforming the new document version into a second set of page images and storing the second set of page images in the repository, the second set of page images formatted according to the image format; and
deleting the data structure based on a determination that transforming the new document version into the second set of page images has completed.

8. The method of claim 1, wherein the modification command comprises a request to reorder at least one page from the first plurality of pages and wherein the data structure maps the at least one page to a target location in the new document version.

9. The method of claim 1, wherein the modification command comprises a request to delete a selected page from the first document, wherein the data structure comprises an indication of the selected page not to be included in the new document version, and wherein the subset of page images does not include a page image that corresponds to the selected page.

10. The method of claim 1, wherein the modification command comprises a request to extract a selected page from the first document and insert the selected page in a destination document, the data structure comprises an indication of the selected page to be included in the destination document and a target location for the selected page in the destination document.

11. The method of claim 10, wherein the destination document is an existing destination document and wherein creating the new document version comprises creating a new version of the existing destination document.

12. The method of claim 1, wherein the viewer application is a browser-based application and the image format is a web supported image format.

13. A computer program product comprising a non-transitory computer readable medium having a set of computer executable instructions stored therein, the set of computer executable instructions comprising instructions for:
   storing a first document according to a first file format in a repository of a document management system, the first document comprising a first plurality of pages;
   transforming the first document into a first set of page images and storing the first set of page images in the repository of the document management system, the first set of page images formatted according to an image format that is browser compatible, each page image in the first set of page images representing a different corresponding page from the first plurality of pages;
   transmitting the first set of page images to a client computer for display within a viewer application;
   receiving a modification command from the viewer application to modify the first document, the modification command indicating a modification to the first document that indicates a change to a page sequence;
   based on the modification command, applying the modification to the first document to create a new document version reflecting the modification;
   prior to creating the new document version:
      creating a data structure modelling a document structure for the new document version, the data structure including a page mapping to information of the first document, wherein the page mapping maps a first page location in the first document to a second page location in the new document version that reflects the change to the page sequence;
      using the data structure to determine a subset of page images from the first set of page images to reuse for a preview of the new document version, wherein the preview of the new document version uses the same page images that are stored in the repository and were transmitted to the client computer and that belong to the subset; and
      generating the preview of the new document version to simulate what the new document version would look like with the modification applied to the first document, the preview of the new document version including the subset of the first set of page images; and
      transmitting the preview of the new document version to the viewer application for display.

14. The computer program product of claim 13, wherein transmitting the preview of the new document version to the viewer application for display comprising transmitting the preview during processing of the modification to create the new document version.

15. The computer program product of claim 13, wherein transmitting the preview of the new document version to the viewer application comprises transmitting the subset of page images and information indicating an order in which the subset of page images should appear.

16. The computer program product of claim 13, wherein transforming the first document into the first set of page images the first set of page images comprises generating the first set of page images for a first version of the first document and creating the new document version comprises creating a second version of the first document.

17. The computer program product of claim 13, wherein the set of computer executable instructions further comprises instructions for destroying the data structure based on a determination that the new document version has been created.

18. The computer program product of claim 13, wherein creating the new document version comprises storing the new document version in the repository according to the first file format.

19. The computer program product of claim 18, wherein the set of computer executable instructions further comprises instructions for:
   transforming the new document version into a second set of page images and storing the second set of page images in the repository, the second set of page images formatted according to the image format; and
   deleting the data structure based on a determination that transforming the new document version into the second set of page images has completed.

20. The computer program product of claim 13, wherein the modification command comprises a request to reorder at least one page from the first plurality of pages and wherein the data structure maps the at least one page to a target location in the new document version.

21. The computer program product of claim 13, wherein the modification command comprises a request to delete a selected page from the first document, wherein the data structure comprises an indication of the selected page not to be included in the new document version, and wherein the subset of page images does not include a page image that corresponds to the selected page.

22. The computer program product of claim 13, wherein the modification command comprises a request to extract a selected page from the first document and insert the selected page in a destination document, wherein the data structure comprises an indication of the selected page to be included in the destination document and a target location for the selected page in the destination document.

23. The computer program product of claim 22, wherein the destination document is an existing destination document and wherein creating the new document version comprises creating a new version of the existing destination document.

24. The computer program product of claim 13, wherein the viewer application is a browser-based application and the image format is a web supported image format.

* * * * *